United States Patent [19]

Furukawa

[11] Patent Number: 5,742,372
[45] Date of Patent: Apr. 21, 1998

[54] APPARATUS FOR MANUFACTURING LIQUID-CRYSTAL PANELS

[75] Inventor: Kyoji Furukawa, Toyokawa, Japan

[73] Assignee: Sintokogio, Ltd., Nagoya, Japan

[21] Appl. No.: 714,654

[22] Filed: Sep. 16, 1996

[30] Foreign Application Priority Data

Sep. 22, 1995 [JP] Japan ................... 7-269151

[51] Int. Cl.⁶ ........................................ G02F 1/13
[52] U.S. Cl. ........................................ 349/187
[58] Field of Search ........................................ 349/187

[56] References Cited

U.S. PATENT DOCUMENTS

| 5,106,441 | 4/1992 | Brosig et al. | 349/187 |
| 5,407,519 | 4/1995 | Joffe et al. | 349/187 |

FOREIGN PATENT DOCUMENTS

| 61-145586 | 7/1986 | Japan . |
| 1-130130 | 5/1989 | Japan . |
| 6-347803 | 12/1994 | Japan . |

*Primary Examiner*—William L. Sikes
*Assistant Examiner*—Walter Malinowski
*Attorney, Agent, or Firm*—Limbach & Limbach L.L.P.

[57] ABSTRACT

An apparatus is provided for manufacturing liquid-crystal panels with a uniform gap by pressing the entire surface of an empty cell, while any warp or undulation in the empty cell is corrected. The apparatus is characterized by a flat pressure-contacting plate 6 mounted on a horizontally fixed base stand 2, a suction frame 10 disposed movably up and down relative to the base stand 2, the frame 10 having a center opening 12 for accommodating and depressurizing the pressure-contacting plate 6 and an empty cell W, a film 13 for transmitting ultraviolet rays to close the opening 12, and ultraviolet-ray radiation means 17 disposed just above the suction frame.

3 Claims, 2 Drawing Sheets

APPARATUS FOR MANUFACTURING LIQUID-CRYSTAL PANELS

FIELD OF THE INVENTION

This invention relates to an apparatus for manufacturing liquid-crystal panels. More specifically, it relates to an apparatus adapted to manufacture a cell with a uniform gap for the crystal panels by sticking both the upper and lower glass substrata together with an ultraviolet-ray hardening resin.

BACKGROUND OF THE INVENTION

As shown below, various conventional methods have been adopted in manufacturing an empty cell having a uniform gap for a liquid-crystal panel by pressing an empty cell that is manufactured by sticking both the upper and lower glass substrata together with an ultraviolet-ray hardening resin. For example, Japanese Patent Early-publication No. 61-145586 discloses a method of manufacturing liquid-crystal panels. In it the gap in the cell is formed such that an empty cell with an unhardened sealing resin is put into a bag made of an ultraviolet-ray transmissible film, and then ultraviolet rays are radiated while the inside of the bag is being depressurized.

Japanese Patent Early-publication No. 6-347803, filed by the applicant, discloses a method comprising the steps of forming a sealed chamber on both rear surfaces of an empty cell, applying compressed air to the inside of the sealed chamber so as to have a uniform pressure on all parts of the surfaces of the cell so that a uniform gap is formed inside the empty cell, and radiating ultraviolet rays onto the uniform surface so as to harden a resin.

Japanese Patent Early-publication No. 1-130130 also discloses a method of manufacturing a cell for a liquid-crystal panel comprising the steps of putting a pressure-contacting film to cover an empty cell mounted on a glass base plate, creating a vacuum in the empty cell covered by the film through a suction hole provided in an end of the base plate so as to tightly press the film against the empty cell, and simultaneously having ultraviolet rays radiate through the glass plate onto the empty cell to harden an ultraviolet-ray hardening resin.

However, these conventional methods have drawbacks in manufacturing cells for liquid-crystal panels. In the first method a gap in the cell may be uneven as no means exists for correcting the warp or undulation of the glass base plate constituting the empty cell. The second method has problems in that since packing means is needed at the periphery of the empty cell, inevitably there is an area with no ultraviolet rays radiated, so that it needs a large, costly empty cell for that area, and in that the pressure at the packing tends to become higher than that in the other part. In the third method, although it has no problems similar to those in the above two methods, when the pressure-contacting film is in a vacuum, the film may be stretched beyond its elastic limit so as to have it tightly adhere to the empty cell, so that the life of the film becomes short, and so that sometimes it has to be changed after it has been once used.

This invention was devised to solve the above problems. The purpose of it is to provide an apparatus for manufacturing liquid-crystal panels wherein the entire surface of the empty cell can be uniformly pressurized and radiated by ultraviolet rays, while the warp or undulation of the empty cell is corrected.

SUMMARY OF THE INVENTION

The above problems can be solved by the apparatus of this invention characterized by a pressure-contacting plate mounted on a horizontally fixed base stand, an upper surface of which plate is flat, a suction frame, a lower surface of which frame can closely contact the base stand, disposed movably up and down relative to the base stand in an area just above the pressure-contacting plate, the frame having a center hole, which vertically passes through the frame, and which can accommodate the pressure-contacting plate and an empty cell, and a suction opening, which is provided in a wall of the frame so as to have the opening communicate with a mechanism for adjusting a vacuum pressure, a film for transmitting ultraviolet rays, hermetically adhering to the suction frame to close the opening, and ultraviolet-ray radiation means disposed just above the suction frame.

DETAILED DESCRIPTION OF THE INVENTION

Figure 1:
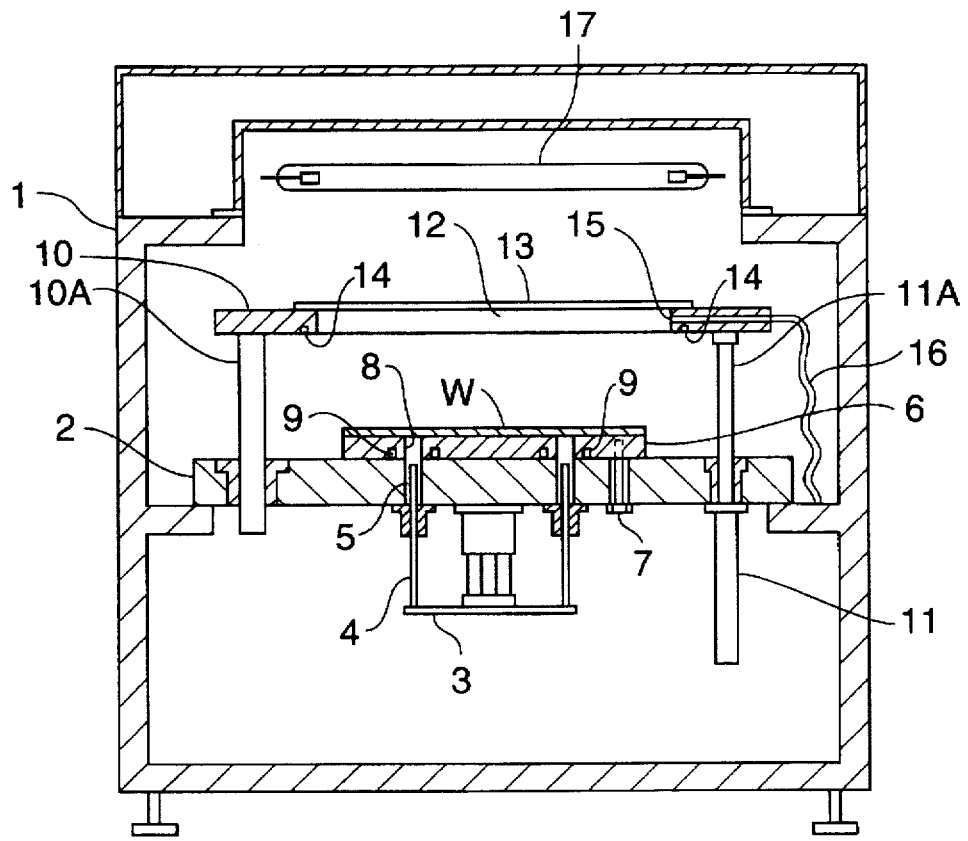
FIG. 1 is a section showing an embodiment of this invention.

One of the preferred embodiments of this invention will now be described in detail by reference to the drawings. In FIG. 1, a base stand 2 is fixed at the central part within a gate-shaped frame 1 by both ends of the stand 2 being placed on projecting parts of the frame 1. At the central part of the lower surface of the base stand 2 is mounted lift means 3 for receiving an empty cell W, and for lifting the empty cell for the liquid-crystal panel after a resin contained in the empty cell has been hardened. Through holes 5 are made in the stand 2, through which holes four push pins 4 of the lift means 3 move up and down.

A pressure-contacting plate 6 having an upper surface of a predetermined degree of flatness (7 μm over the entire surface) is detachably mounted on the upper surface of the base stand 2 with a bolt 7 passing through the stand 2 from its bottom. Through holes 8 are made at locations in the pressure-contacting plate 6 corresponding to the through holes 5, so that their axes align with those of the through holes 5, and so that the pins 4 can move up and down therethrough. An O-ring 9 is fit in the lower surface of the pressure-contacting plate 6 at the peripheries of the through holes 8 so that air does not leak from between the plate 6 and stand 2. As mentioned above, the upper surface of the pressure-contacting plate 6 has a very good degree of flatness so that no air can pass between the plate 6 and the empty cell W to leak through the through holes 5,8.

A suction frame 10 is disposed just above the pressure-contacting plate 6. Four guide bars 10A are fixed to the lower surfaces at the four corners of the suction frame 10 so that the lower parts of the guide bars slidably pass through the base stand 2. Piston rods 11A, of four cylinders 11, mounted on the bottom surfaces of the base stand 2, pass through the base stand 2, and are connected to the lower surfaces of the suction frame 10 at positions near the guide bars, so that the suction frame 10 can move up and down relative to the pressure-contacting plate 6 and base stand 2.

When the piston rods 11A are located at their highest position, enough distance is assured to carry an empty cell W onto the pressure-contacting plate 6 between the suction frame 10 and pressure-contacting plate 6. When the piston rods 11A are located at their lowest position, the lower surface of the suction frame 10 tightly contacts the upper surface of the base stand 2. A through opening 12, vertically passing through the suction frame 10, is made so that its center coincides with that of the pressure-contacting plate 6. The depth of the opening 12 is within a range of ±1 mm of the sum of the thicknesses of the pressure-contacting plate 6 and the empty cell W. The inside diameter of the through opening 12 is larger than the outer diameter of the empty cell by a given value T. Thus, the through opening 12 is large enough to accommodate the pressure-contacting plate 6 and empty cell W.

An ultraviolet-ray transmission film 13, which transmits enough ultraviolet rays as are needed, and which has needed properties such as extensibility, flexibility, and resistivity to ultraviolet rays, is hermetically fixed to the upper surface of the suction frame 10, with its periphery adhering thereto with two-sided adhesive tapes, to cover the through opening 12. An 0-ring 14 engages the entire periphery of the opening 12 at the lower surface of the suction frame 10. The ultraviolet-ray transmission film 13 may be fixed to the upper surface of the suction frame 10 by using a method other than the above-mentioned one. For example, the 0-ring 14 may first be caused to engage the periphery of the opening 12 at the upper surface of the frame 10, next the film 13 is put thereon, and then the film is held down by a hold-down plate to be screwed down by a cap screw.

A suction hole 15 is made. It passes through the frame 10 from the opening 12 to its outer side. A vacuum pressure-adjusting unit (not shown), which comprises a vacuum-pressure sensor, electro-pneumatic proportional valve, and vacuum pump, and which can suck at a given pressure, is connected to the suction hole 15 at the outer side of the frame 10 via a tube 16 so as to have the opening 12 communicate with the vacuum pressure-adjusting unit.

An ultraviolet-ray radiation means 17 is disposed just above the suction frame 10 within the gate-shaped frame 1 with its direction of radiation directed downwards.

Figure 3:
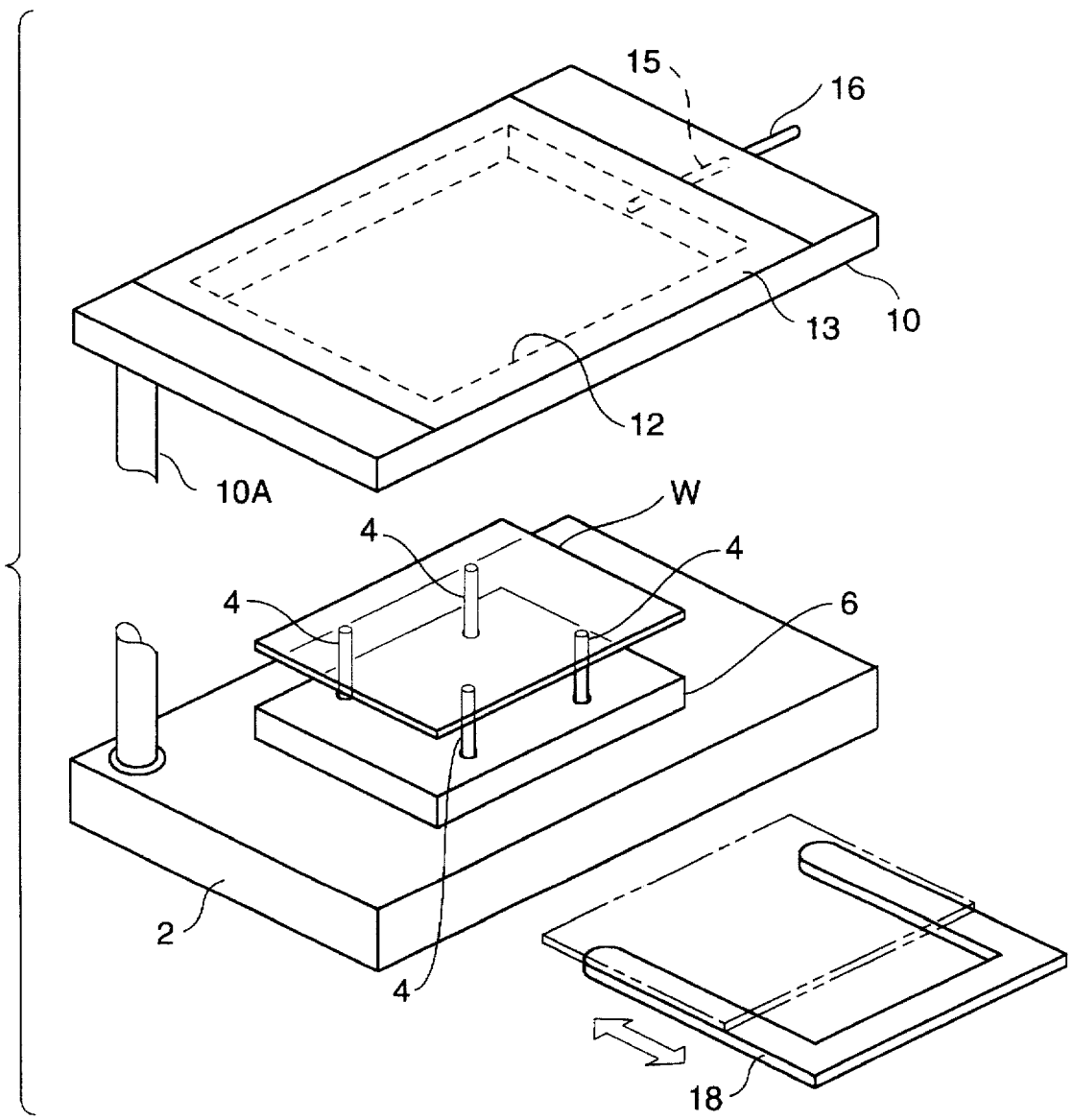
FIG. 3 is an enlarged perspective showing the main part of the above embodiment of this invention.

To manufacture an empty cell for a liquid-crystal panel by using the thus-structured apparatus, a conveyor 18 (see FIG. 3), on the upper surface of which the empty cell W is placed, is first driven in between the suction frame 10 and pressure-contacting plate 6 by means of a drive (not shown). Next, the push pins 4 are moved up by driving the lift means 3 so as to make the cell W project by a needed distance for the cell to be delivered. The push pins 4 are then moved down after the conveyor 18 has been removed, so as to put the empty cell W on the pressure-contacting plate 6.

Figure 2:
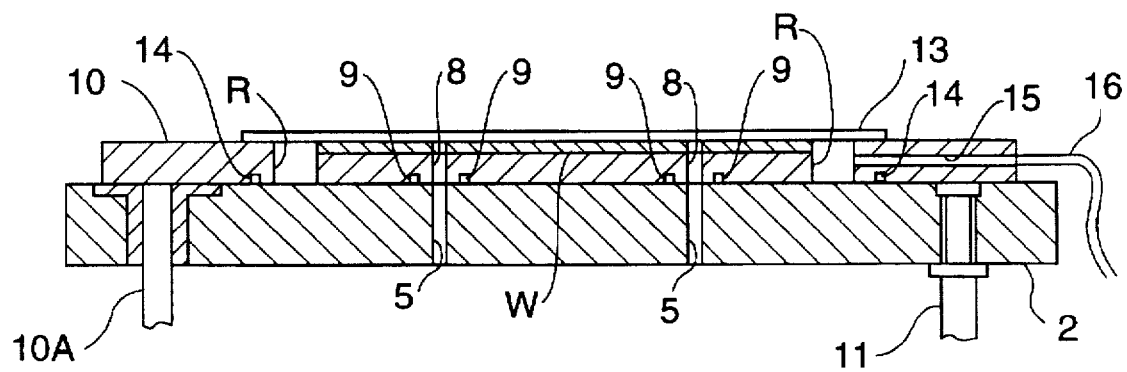
FIG. 2 is an enlarged section showing the main part of an empty cell being pressed.

An airtight chamber R, wherein the pressure-contacting plate 6 and the empty cell W above it are surrounded by the ultraviolet-ray transmission film 13 and base stand 2, is provided by having the suction frame 10 move down by driving the cylinders 11 so that the upper surface of the stand 2 tightly contacts the lower surface of the frame 10 (FIG. 2).

Next, the airtight chamber R is depressurized by sucking the chamber R through the suction hole 15 by driving the vacuum pressure-adjusting unit (not shown). At this time the airtight chamber R can be depressurized to a given pressure since the upper surface of the pressure-contacting plate 6 has a very fine degree of flatness so that air does not pass between and through the plate 6 and cell W to leak through the through holes 5,8. Air leaking through the through holes 5,8 may be completely avoided by disposing a sheet of rubber between the pressure-contacting plate 6 and the empty cell W.

When the airtight chamber R is depressurized, the ultraviolet-ray transmission film 13, connected to the suction frame 10, gradually bends during the depressurization, with its connected periphery acting as a fulcrum, so that the upper surface of the cell W, which is put on the pressure-contacting plate 6, which is just under it, is pressed by a given pressure. At this time the distance between the lower surface of the film 13 and the upper surface of the cell W is kept very short, so that the ultraviolet-ray transmission film 13 will not be forcedly stretched beyond its elastic limit.

As stated above, the depth of the opening 12 is within a range of ±1 mm of the sum of the thicknesses of the pressure-contacting plate 6 and the empty cell W mounted thereon. The inner diameter is set at a size that is larger than the outer diameter of the empty cell W by a given value T (more than 1 mm and less than 10 mm), the given value of which T is determined based on properties such as the extensibility of the film 13, thickness of the cell W, and size of the plate 6. There are problems in that when the ultraviolet-ray transmission film 13 is stretched through suction, and when it has tightly contacted the side surface of the pressure-contacting plate 6 by surrounding the side surface of the empty cell W, an area within the film located inside the tightly contacted surface is not sucked any more. However, any value other than those within the above range may be used, unless the film 13 contacts the side surface of the plate 6 even when it is stretched.

When the external size of the empty cell W is much smaller than the internal size of the opening 12 of the suction frame 10 that is provided in advance, and when the ultraviolet-ray transmission film 13 is stretched and contacts the upper surface of the base stand 2, while the airtight chamber R is being sucked as is, a window frame-shaped spacer, the height of which spacer is about the same as that of the empty cell W, and which spacer has a vent hole and an opening, whose internal size is about the same as the external size of the empty cell W, may be put on the base stand 2 with the empty cell W being accommodated in its opening so as to fill any gaps between the opening 12 and the empty cell W up to a needed degree so that the stretched film is prevented from contacting the upper surface of the stand 2.

Since the pressure-contacting plate 6 is detachably mounted by the bolt 7, its thickness can be optimized by using ones of slightly different thicknesses. They are prepared in advance in accord with the extensibility of the ultraviolet-ray transmission film 13 or commensurate with the thickness of the empty cells W.

Since the upper surface of the pressure-contacting plate 6, on which the empty cell W is mounted, is extremely flat, the cell W is pressed until it has a given gap, while the warp or bend of the empty cell W is corrected according to the flatness.

The ultraviolet-ray radiation means 17 is activated while the empty cell W is being pressed, or after the cell W has been completely pressed and depressurized to radiate a proper amount of ultraviolet rays to the cell W via the ultraviolet-ray transmission film 13 so as to harden an ultraviolet-ray hardening resin, which is applied to the inside of the cell W as a sealing material, to produce cells for liquid-crystal panels.

After the ultraviolet-ray hardening resin has been hardened, and after the radiation of the ultraviolet rays has been stopped, the suction frame 10 is moved up by driving the cylinder 11 reversely. Next, the push pins 4 are raised by driving the lift means 3 so as to move up the completed cell for liquid-crystal panels. Then, after the cell has been received by the conveyor 18 (see FIG. 3), which approaches the inside of the gate-shaped frame 1 from its front, the push pins 4 are moved down to their original places by reversely driving the lift means 3. After that, one cycle of the process is completed by reversing the conveyor 18.

Although the pressure-contacting plate 6 is affixed to the base stand 2, they may also be integrated into a unit.

Among the embodiments of this invention, one equipped with lift means 3 is disclosed. However, in an apparatus for manufacturing liquid-crystal panels having no lift means 3, the empty cell W may be carried in or out by suction means for holding the empty cell for the liquid-crystal panels, instead of by the conveyor 18.

Clearly from the above descriptions the apparatus of this invention has effects in that it can apply a uniform pressure over the entire empty cell, so that uniform gaps can be obtained, and so that the entire empty cell can be effectively used as an empty cell for liquid-crystal panels, resulting in a decrease in their cost. It also has effects in extending the life of ultraviolet-ray transmission films as pressure-contacting means.

What is claimed is:

1. An apparatus for manufacturing liquid-crystal panels comprising a pressure-contacting plate 6 mounted on a horizontally fixed base stand 2, an upper surface of which plate is flat, a suction frame 10, a lower surface of which frame can tightly contact the base stand 2, disposed movably up and down relative to the base stand 2 in an area just above the pressure-contacting plate 6, the frame having a center opening 12, which vertically passes through the frame, and which can accommodate the pressure-contacting plate 6 and an empty cell W, and a suction opening 15, which is provided in a wall of the frame so as to have the opening 12 communicate with a mechanism for adjusting a pressure of a vacuum, a film 13 for transmitting ultraviolet rays, hermetically adhering to the suction frame 10 to close the opening 12, and ultraviolet-ray radiation means 17 disposed just above the suction frame 10.

2. An apparatus of claim 1, wherein the empty cell W contains an ultraviolet-ray hardening resin.

3. An apparatus of claim 1 further comprising a window frame-shaped spacer, the height of which spacer is about the same as that of the empty cell W, and which spacer has a vent hole, and an opening whose internal size is about the same as the external size of the empty cell, for filling gaps between the opening 12 and the empty cell W to a needed degree so that the stretched film 13 is prevented from contacting the upper surface of the stand 2.

* * * * *